(12) United States Patent
Halstvedt (10) Patent No.: US 10,585,891 B2
(45) Date of Patent: Mar. 10, 2020

(54) DYNAMIC CHOICE OF DATA SOURCES IN NATURAL LANGUAGE QUERY PROCESSING

(71) Applicant: SoundHound, Inc., Santa Clara, CA (US)

(72) Inventor: Scott Halstvedt, Santa Clara, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 221 days.

(21) Appl. No.: 15/342,970

(22) Filed: Nov. 3, 2016

(65) Prior Publication Data

US 2018/0121508 A1    May 3, 2018

(51) Int. Cl.
  *G06F 16/2453*    (2019.01)
  *G06F 16/33*      (2019.01)

(52) U.S. Cl.
  CPC .... *G06F 16/24545* (2019.01); *G06F 16/3344* (2019.01)

(58) Field of Classification Search
  CPC ......... G06F 17/30442; G06F 17/30554; G06F 17/30867; G06F 17/30463; G06F 17/30477; G06F 17/30469; G06F 16/24545; G06F 16/3344
  USPC ................. 705/12, 14.45, 26.44, 7.25; 718/1
  See application file for complete search history.

(56) References Cited

U.S. PATENT DOCUMENTS

| | | | |
|---|---|---|---|
| 6,457,047 B1 * | 9/2002 | Chandra ........... | G06F 17/30902 707/E17.12 |
| 7,596,568 B1 * | 9/2009 | McConnell ....... | G06F 17/30672 |
| 8,155,962 B2 * | 4/2012 | Kennewick ............. | G10L 15/22 704/257 |
| 2001/0044795 A1 * | 11/2001 | Cohen ............... | G06F 17/30699 |
| 2001/0047355 A1 * | 11/2001 | Anwar .............. | G06F 17/30395 |
| 2003/0037034 A1 * | 2/2003 | Daniels ................ | G06Q 10/087 |
| 2003/0177111 A1 * | 9/2003 | Egendorf .......... | G06F 17/30864 |
| 2005/0055357 A1 * | 3/2005 | Campbell ................. | G06F 8/61 |
| 2007/0050328 A1 * | 3/2007 | Li ..................... | G06F 17/30967 |

(Continued)

OTHER PUBLICATIONS

Anastasios Kementsietsidis, Scalable MultiQuery Optimization for Exploratory Queries over Federated Scientific Databases, PVLDB '08, Aug. 23-28, 2008, pp. 16-27, ACM, Auckland, New Zealand.

*Primary Examiner* — Jay A Morrison
*Assistant Examiner* — Ken Hoang
(74) *Attorney, Agent, or Firm* — David R. Stevens; Stevens Law Group (57) ABSTRACT

A virtual assistant receives natural language interpretation hypotheses for user queries, determines entities and attributes from the interpretations, and requests data from appropriate data sources. A cost function estimates the cost of each data source request. Cost functions include factors such as contract pricing, access latency, and data quality. Based on the estimated cost, the virtual assistant sends requests to a plurality of data sources, each of which might be able to provide data necessary to answer the user query. By including user credits in the cost function, the virtual assistant provides better quality of results and answer latency for paying users. The virtual assistant minimizes latency by answering using data from the first responding data source or provides a latency guarantee by answering with the most accurate data received by a deadline. The virtual assistant measures data source response latency and caches responses for expensive requests.

18 Claims, 5 Drawing Sheets

(56) References Cited

U.S. PATENT DOCUMENTS

| | | | |
|---|---|---|---|
| 2008/0140699 A1* | 6/2008 | Jones | G06F 16/3325 |
| 2012/0005148 A1* | 1/2012 | Horvitz | G06N 5/043 |
| | | | 706/50 |
| 2013/0081044 A1* | 3/2013 | Sandstrom | G06F 15/80 |
| | | | 718/104 |
| 2014/0214820 A1* | 7/2014 | ODonnell | G06F 17/3061 |
| | | | 707/726 |
| 2016/0004706 A1* | 1/2016 | Faghihi Rezaei | G06F 16/3322 |
| | | | 707/706 |

* cited by examiner

```
for(i=1;i<=NUM_SOURCES;i++)
   cost[i]=(Wacc*accuracy[i]
         + Wpri*price[i]
         + Wlat*latency[i])
         * score(hypothesis);

cost[domain_default_source]=0;

thresh_cost=remaining_credit();

for(i=1;i<=NUM_SOURCES;i++)
   if(cost[i]<thresh_cost
     &data_type_match(source[i],E,A))
      hit_source(i,E,A);
```

FIG. 3

```
biggovernmentweather.gov
hit cost: $0
refresh rate: 12 hour
latency:  2.5 seconds yourfunweatherreport.com
hit cost: $.00025
refresh rate: 1 hour
latency:  0.7 seconds bigweathercompanyxyz.com
hit cost: $.001
refresh rate: 1 hour
latency:  0.1 seconds
```

DYNAMIC CHOICE OF DATA SOURCES IN NATURAL LANGUAGE QUERY PROCESSING

FIELD OF THE INVENTION

The present invention is in the field of virtual assistants, and particularly accessing data sources.

BACKGROUND

The modern world thrives on data, and virtual assistant apps and devices make different types of interesting data accessible to users who wish to make queries. Some examples of data are hourly weather forecasts; minute to minute status of traffic on local roads; scores of sports games in progress; stock prices; news headlines; retail store item stock and sale prices; recipes; locations and ratings of restaurants; Wikipedia articles; and jury findings in trial case law.

Many providers of access to data make it available through communication protocols such as JavaScript Object Notation (JSON), Extensible Hypertext Markup Language (XHTML), or plain text responses to HyperText Transport Protocol (HTTP) POST, Asynchronous Javascript and eXtensible markup language (AJAX), or Simple Object Access Protocol (SOAP) requests through web Application Program Interface (API) hits. Various other types of access to data in databases are possible. Many providers give requesters, such as virtual assistants, access through unique ID keys that track numbers of requests and, for each request, deduct credits. Virtual assistant services agree to contracts to buy credits, typically at prices of a small fraction of a penny for each credit. Contracts can take the form of signed documents, verbal agreements, online clicked acknowledgments, credit card authorizations, or others. In various cases, virtual assistant providers charge users for the service or charge advertisers to show specific ads in response to virtual assistant queries.

Many types of data are available from multiple providers. For-profit data providers tend to compete for the business of selling credits. Some data providers are non-profit and provide data access free of charge. For example, weather forecast data is available from The Weather Channel at weather.com, The Weather Company a wunderground.com, AccuWeather, Inc. at accuweather.com, and United States National Weather Service at weather.gov.

Different data sources have different advantages. Some charge less money per request. Some have data that are more accurate. Some have data that is more precise, such as ratings on a scale of 1 to 10 instead of 1 to 5 stars. Some respond more quickly, that is, with lower latency. Some have more bandwidth to handle multiple concurrent requests. Some have better data formats and details. Some are more dependably available than others. Some are seasonally available, such as sports standings, occasionally available, such as democratic election campaign polls, or daily available such as intensity of sunlight. Various data sources have other differentiating advantages specific to the types of data that they provide. Virtual assistant services must choose data sources, and their choice of data sources strongly affects the satisfaction that they provide to users.

The disclosed invention provides an improved approach for selecting data sources by a virtual assistant.

SUMMARY OF THE INVENTION

The present disclosure is directed to various aspects and embodiments of novel systems and methods for virtual assistants to dynamically choose between sources of data useful for providing answers to user queries. A virtual assistant system maintains a list of data sources that are applicable to different domains of user queries and might have data appropriate for answering queries within each domain. Domains may include weather, food, sports, music, courtroom proceedings, and others. The list includes, for at least one domain, at least two applicable data sources. When interpreting queries with a reasonable likelihood of being within the domain, the virtual assistant system applies a cost function to compute a cost for making a request to each of the applicable data sources. Based on cost thresholds and the relative costs of accessing each data source the virtual assistant system chooses which one or more data source from which to request data to answer the query.

Various function rules of various factors, according to various embodiments of the invention, are appropriate for various virtual assistants and various data sources. Some examples of factors are contract pricing per hit; estimated data quality; measured or guaranteed API request to response latency; currently pending and allowed maximum concurrent requests; measured or guaranteed up-time reliability; whether the data source and virtual assistant provider have a business partnership; and whether the end user has permission to access certain data. Various embodiments measure data quality in various ways, such as accuracy, granularity, and consistency.

The scope of the present invention encompasses machines that process and methods of processing that produce requests for data from multiple data sources. More extensive systems, of which such machines and processes are components, are also encompassed by the present invention. Some such systems are virtual assistants that perform natural language understanding. Some such systems are ones that also perform speech recognition.

In various systems, a natural language query is any expression—spoken, typed, written, gestured, or otherwise—that can be parsed by natural language processing, and requests information that is representable as data.

DETAILED DESCRIPTION

Some embodiments of the invention operate on simple query input that indicates a specific required data value, such as the current temperature at Heathrow Airport or the dictionary definition of the word Troglodyte. Some embodiments output simple answers such as a single integer number, a Boolean value, an enumerable value, or string of text. Some embodiments operate on complex query input such as streams of audiovisual data with geolocation information. Some embodiments output complex answers such as command data structures with multiple parameters for actuating each of multiple motors. Some embodiments that process natural language queries are exemplary of the present invention.

Figure 1:
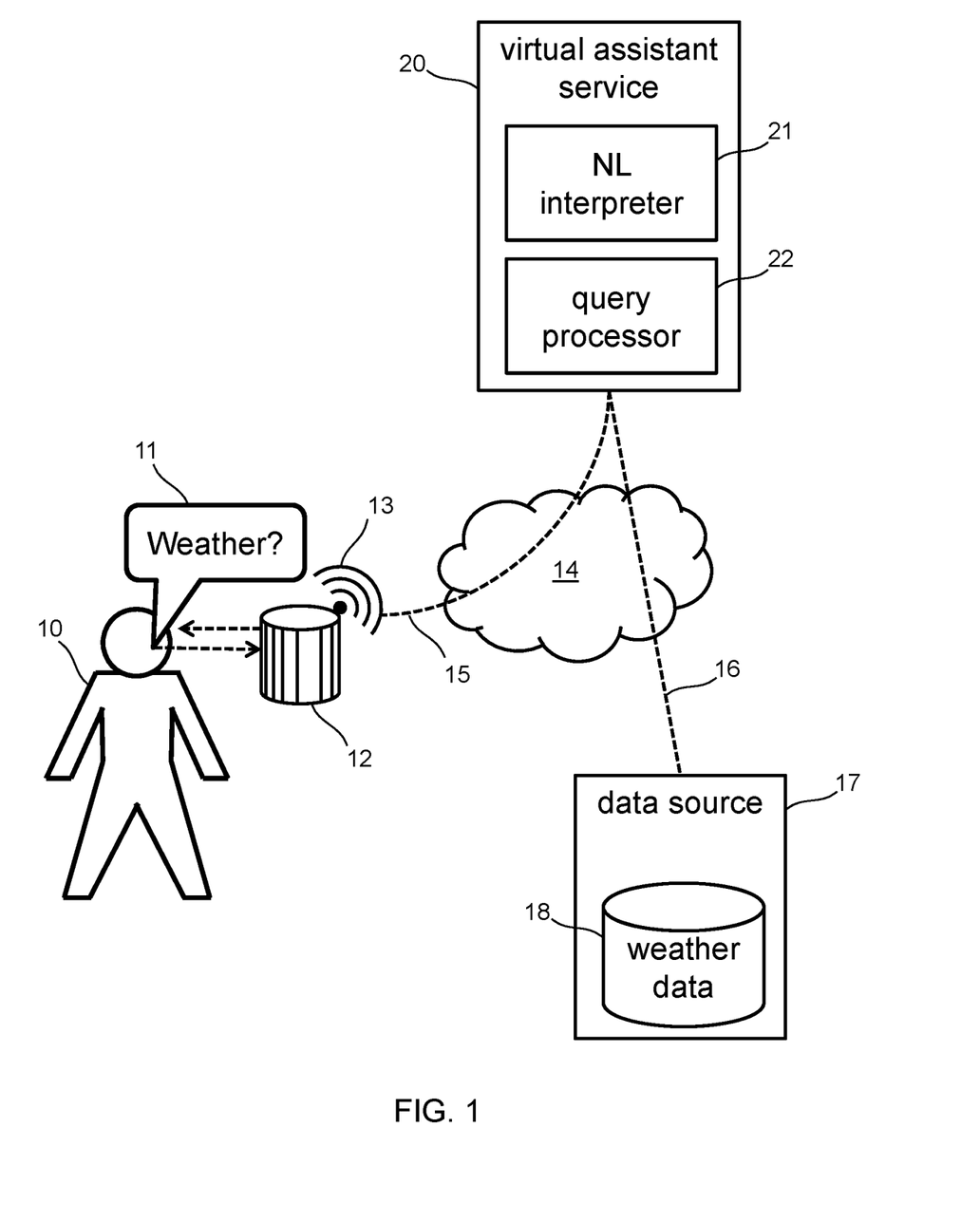
FIG. 1 illustrates a scenario of usage of a virtual assistant that accesses a data source.

FIG. 1 shows a scenario of a user querying a virtual assistant for an answer, and the virtual assistant requesting and a data source responding to provide the data for the answer. In the scenario, a user 10 speaks a query 11 about the weather. A household assistance device 12 detects and recognizes the speech. The device 12 connects through a network interface, such as WiFi interface 13, to the Internet 14. The household assistance device 12 sends the recognized speech of the query through connection 15 to virtual assistant service 20. Virtual assistant 20 comprises a natural language interpreter 21, which process and interprets the recognized speech and sends the interpretation to a query processor 22. The query processor 22 sends a request through connection 16 across the internet 14 to data source 17, which comprises a dynamic database of weather data 18.

Data source 17 proceeds to look up the weather in database 18 and send a response over connection 16 to virtual assistant service 20. Virtual assistant 20 forms an answer to the query comprising the weather data. Virtual assistant 20 proceeds to send the answer over connection 15 across the internet 14 to the household assistant device 12, which outputs audio with the answer to the weather query.

Various other embodiments perform similar functions, but in different positions or with other steps. For example, some embodiments perform speech recognition within the virtual assistant service 20, and some embodiments perform data caching in the virtual assistant service 20 and in the household assistant device 12. Furthermore, many types of devices other than household assistance devices 12 are useful for human-machine interaction. Some examples are mobile phones, automobiles, and cognitive enhancement implants (CEIs).

Figure 2:
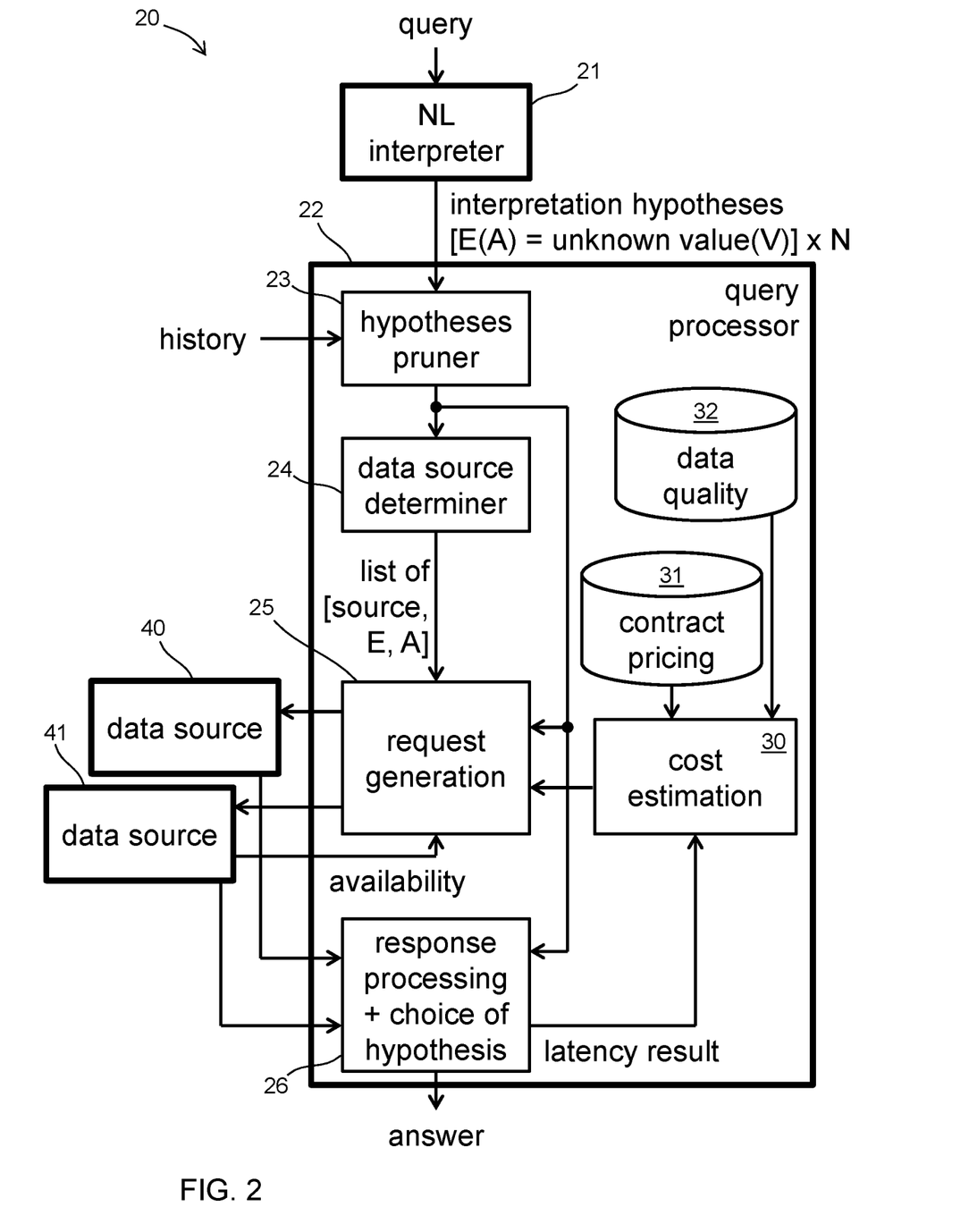
FIG. 2 illustrates a virtual assistant system according to an embodiment of the invention.

FIG. 2 shows a virtual assistant system 20 according to an embodiment of the invention. System 20 receives queries and processes them with natural language interpreter 21. It produces a number, N, of interpretations, each of which might represent the user's intent, and, for each, a score representing an estimate of the likelihood of the interpretation being correct. Some queries produce thousands of interpretation hypotheses, and produce new ones every ten milliseconds, though other frequencies are also appropriate.

The output of natural language interpreter 21 is interpretation hypotheses that represent user intent as relationships between entities, E, each having attributes, A, each having values V. For example, a person entity has a height attribute with a value that indicates a number of centimeters. System 20 would represent the query, "Is Alice taller than Bob?", as a greater-than comparison between the value of the height attribute of the entity named Alice and the value of the height attribute of the entity named Bob. To process the query, "How old is Miley Cyrus?", system 20 would look up the value of the birth date attribute of the person entity Miley Cyrus, and subtract the birth date from the current date to compute an age. Some values are not numerical. For example, processing the query, "What's the weather?" requires looking up the location of the user, searching for the nearest city or airport location, hitting a weather data provider API by providing the name of the location and the fact that sky conditions is the attribute, and receiving a response indicating sunny, overcast, raining, or snowing.

Some embodiments perform actions as a result of imperative queries. For example, a query, "Call me a ride." provides an NL interpretation requiring not an information request, but a command for a car service to send a car to the user location. In this case, fulfilling the intent of the request is equivalent to a data access through an API.

In the embodiment of FIG. 2, a query processor 22 takes in the interpretation hypotheses and produces an answer. In a first step of processing, a hypotheses pruner 23 takes the set of N interpretation hypotheses, checks whether they make sense in the context of the history of other recent queries and answers, and discards hypotheses that have low scores or that do not fit with the history context. Some embodiments perform hypotheses pruning based on scores. In some embodiments, the NL interpreter does the pruning. In some embodiments, the interpretation depends on the value of data. In such embodiments, the query processor provides an output that is fed back into the NL interpreter. Accordingly, the query processor only provides a final answer after the NL interpreter provides its final interpretation hypothesis or hypotheses. For each iteration, the NL interpreter refines its hypothesized interpretation based on the values of intermediate data.

For example, consider a user query of a virtual assistant, with two transcription hypotheses, "how much to tighten a pumps belt if there is bow on the slack side" and "how much to lighten a pumps belt if there is bow on the slack side". Because of background noise in the query audio, both transcriptions are highly probable. Every word in the transcriptions is common both in the domain of auto mechanics and in the domain of women's clothing, therefore yielding four interpretation hypotheses. A device or process that incorporates or uses system 20 compares each interpretation hypothesis to the chosen transcription and interpretations in a buffer of the previous three queries. For each of the buffered queries that mentions tightness or looseness, hypotheses pruner 23 boosts the probability score of the interpretation hypotheses derived from the first transcription hypothesis, whereas for each of the previous queries that mentions lightness or darkness, hypotheses pruner 23 boosts the probability score of the interpretation hypotheses derived from the second transcription hypothesis. For each word in the buffered transcription that matches keywords in the auto mechanics domain, hypotheses pruner 23 boosts the probability score of the auto mechanics interpretation hypotheses, whereas for each word in the buffered transcription that matches keywords in the women's clothing domain, hypotheses pruner 23 boosts the probability score of the auto mechanics interpretation hypotheses. After boosting scores, hypotheses pruner 23 discards any interpretation hypotheses with a probability score below a target threshold. As a result, interpretations are much more accurate than without a history-based hypotheses pruner. Furthermore, by pruning very unlikely interpretation hypotheses, various embodiments provide for lower requirements on computer processor usage and computer processor memory bandwidth, thereby reducing data center power consumption and allowing a given number of servers to handle a greater number of user queries and do so with lower latency.

The limited remaining likely hypotheses go from pruner 23 to data source determiner 24. For each hypothesized interpretation, the data source determiner determines, based on which types of entities, attributes, and values are in the query, which data sources might have the data needed to produce an appropriate answer. Data source determiner 24 outputs, for each interpretation hypothesis, a list of sources, entities, and attributes needed.

Consider the user query "what are the temperature and humidity going to be tomorrow". A correct interpretation hypothesis identifies that: this requires two pieces of data, one that is a temperature attribute and one that is a humidity attribute; both pieces of data are related to a weather entity, and that the time attribute is tomorrow. Data source determiner 24 determines that two weather data requests are necessary, and that they can be served by any one of several weather data providers' APIs.

Consider a correct interpretation of the user query "what will be the weather at the 49ers game tomorrow." Data source determiner 24 recognizes that this requires a weather entity data access with time attribute tomorrow and a location attribute that is the location of the 49ers game tomorrow. Data source determiner 24 further recognizes that the weather data request location attribute requires the result of a location attribute of a 49ers game entity with time attribute tomorrow. Data source determiner outputs a list of necessary data source requests, first including sports game location data sources, 49ers entity, a time attribute of tomorrow, and a request for location data, and second including a weather location data sources, a weather entity, a time attribute of tomorrow, and a location attribute indicating the result of the previous member of the list.

A request generator 25, takes in the list, as well as the pruned interpretation hypotheses. It also takes in a cost estimate from a cost estimator 30 for accessing each of a number of data sources. The embodiment shown in FIG. 2 has a first data source 40 and a second data source 41. Based on the cost estimate of each source, and the number of values needed that the source might have, the request generator 25 determines whether to request data from the data sources 40, 41. In various embodiments, the need to request data access is in the form of a text string, pointer, address, or other identifier. For each source, if its cost, multiplied by the number of values it can supply, is less than a cost threshold, request generator 25 requests data from the data source through an API hit. Some embodiments do not use API hits, but access data in other ways known to ordinarily skilled practitioners. Some embodiments sample data from sensors. Some embodiments read data from computer readable media. Some embodiments have custom data transfer protocols that are different from typical web API hits.

In the embodiment of FIG. 2, to ensure that system 20 provides some appropriate answer with data for each query, even if all data source costs are above the threshold, request generator 25 issues a request to the data source with the lowest cost. If all costs are above the threshold, and more than one data source is tied for the lowest cost, request generator 25 ping-pongs, i.e. alternates, between the two data sources 40, 41. Some embodiments with greater than two data sources choose them in a rotating or round-robin order.

Some data sources are sometimes unavailable. In the embodiment of FIG. 2, data source 41 provides a signal to request generation 25 to indicate its availability. Some embodiments use a timeout mechanism. Regardless of an availability signal, if such embodiments receive no response within a particular period of time then they assume unavailability of the data source. Some embodiments store a record of data source availability, and use that in their cost functions. In some embodiments, a record of data source availability is a Boolean value indicating whether the data source is known to be available or not. In some embodiments the record of data source availability is time-dependent. In some embodiments the record of data source availability is dependent on the state of a network connection link. In some embodiments the record of data source availability depends on whether a user is logged in to a system. In some embodiments the record of data source availability is a log of instances of intermittent availability and unavailability. Some embodiments poll a data source from time to time to determine its availability.

Response processing 26 completes the query processing and produces the answer. It does so with the pruned interpretation hypotheses, and the responses from the data sources. By analyzing the data and pruned hypotheses, response processing 26 chooses the single most likely hypothesis in order to generate the answer. Response processor 26 provides the answer as text with an indication of word emphasis. In speech-enabled systems, the answer goes to a text-to-speech engine to produce a spoken audible response.

Response processing 26 takes in the hypotheses of hypotheses pruner 23. It identifies the EAVs needed to formulate a response. It takes as input the data values received from data sources such as data source 40 and data source 41. Various embodiments of response processing are appropriate. In the embodiment of FIG. 2, response processing 26 analyzes the responses from the data sources. If one or more response indicates that it is an invalid request, response processing 26 discards the hypothesis that the request was made to satisfy. The response processing 26 of FIG. 2 further identifies certain kinds of nonsensical response data, such as weather temperatures above 150 degrees Fahrenheit, above 55 degrees Celsius, or below negative 40 degrees. Request generation 25 identifies hypotheses that depend on the same EAVs, and performs a single request to satisfy all such hypotheses. Response processing 26 distributes the data responses to each of the hypotheses that the results can satisfy. Finally, based on the probability score of each interpretation hypothesis, and whether they are satisfied by valid and sensible data, generates the answer.

The effectiveness of achieving superior cost/performance trade-offs depends on the usefulness and accuracy of cost estimates. In system 20, query processor 22 comprises cost estimation 30, which produces the cost estimate used by request generation. According to the embodiment of FIG. 2, cost estimation 30 is a function of inputs from contract pricing information 31 and data source quality information 32. Response processing 26 provides an output indicating the latency request to response latency for each data source access. Cost estimation 30 uses the latency results as another input to the cost estimation function.

Various embodiments use various cost estimation functions. In some embodiments the cost estimation function is a sum of scaled (multiplied by a constant) and weighted (multiplied by an importance value) values of multiple values of relevant information. Some cost estimation functions apply conditional or logical functions or both, such as including an input in the function if a second input or a third and fourth input are within designated ranges but not if a fifth input is true.

In some embodiments, for which minimum query answer latency is desirable, the virtual assistant system 20 sends the request to multiple data sources concurrently, and uses data from whichever data source provides the earliest response. In some embodiments that provide guaranteed maximum query answer latency, the virtual assistant system 20 chooses the most accurate response among all data source responses that responded in time to meet the answer latency requirement. In some such embodiments, upon receiving the response data to form a query answer, the virtual assistant system 20 sends a signal to other data sources 40, 41 with pending API hits to cancel the request.

Some embodiments require a guaranteed answer quality, but are not latency critical. Some such embodiments send requests to data sources and, upon receiving a response that the data is unavailable or that the quality is insufficient to form a useful answer, send requests to secondary data sources. For such embodiments, the more expensive data sources are reserved as secondary.

Some embodiments store data from data source responses in a cache, and use it for future query answers for which the data is appropriate. Whether to cache, and when to replace data in the cache, depends on the cost of requesting it. Various cache replacement algorithms are appropriate, and should take into consideration the shelf life of the data. Weather data, for example, remains accurate for about 1 hour. Birth dates remains accurate perpetually. Stock prices change continuously, and should not be cached at all. Furthermore, depending on contractual agreements between virtual assistant providers and data source providers, some data is uncacheable or comes with an obligation for the virtual assistant system to count cache hits against API hit credits.

FIG. 2 shows certain modules that perform certain functions within a particular embodiment. Ordinarily skilled practitioners of the art will recognize that the number and order of modules, their connections, the functions that each performs, and the type of information transferred between modules can vary between functional embodiments. Furthermore, the connections shown in FIG. 2 illustrate certain information passed between modules as needed for describing the particular embodiment. Practitioners will recognize that other ancillary modules will be necessary for other functions of various embodiments, and information and connections other than ones shown in FIG. 2 are necessary. Furthermore, the modules shown in FIG. 2 can each, independently, be implemented in software, hardware such as ASICs and FPGAs, or a combination of software and hardware. Some embodiments run software on computer processors with custom instruction sets specifically optimized for the functions of the system.

Figure 3:
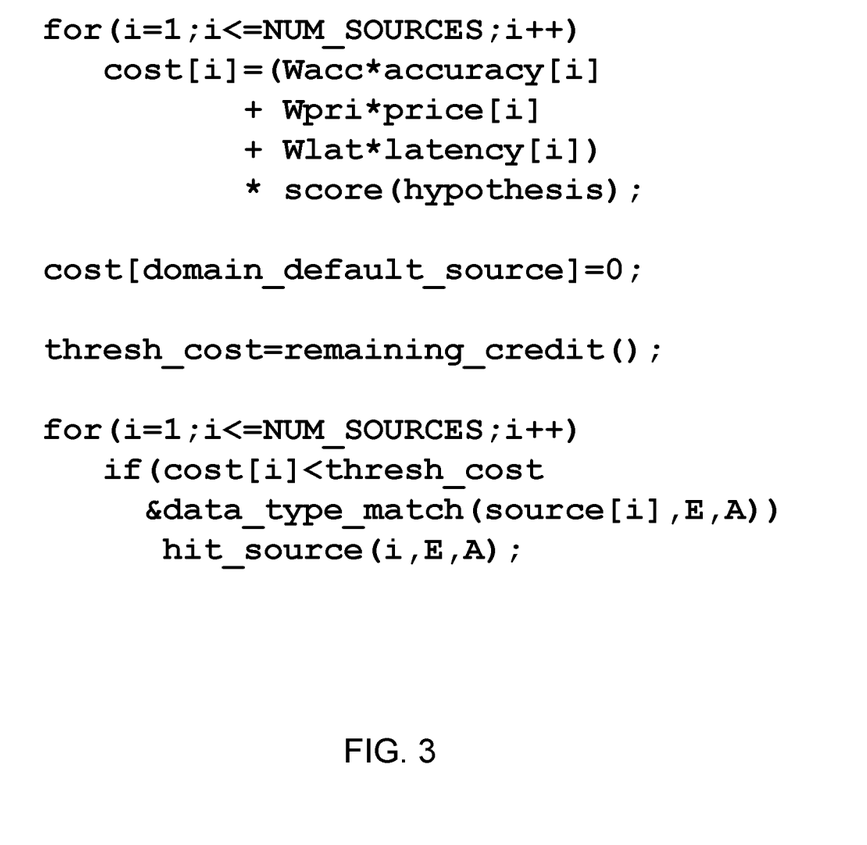
FIG. 3 illustrates example code that may run for each domain hypothesis of each query according to an embodiment of the invention.

FIG. 3 shows source code for a cost estimation function according to an embodiment. For each query, the function runs once for each EAV (entity, attribute, value) triple required for each hypothesis that results from hypothesis pruner 23. NUM_SOURCES is a constant value representing the number of data sources available to the system 20. Variable accuracy[ ] is an array that stores a data accuracy estimates for each data source. Variable price[ ] is an array that stores a per-query price for each data source. The price for requests to each data source varies for some data sources. Therefore, the price[ ] array values change from time to time. The array assignments are made outside of the scope of the function of FIG. 3. Variable latency[ ] is an array that stores a request to response latency estimates for each data source. Variables Wacc, Wpri, and Wlat are weights that indicate the relative importance of each of accuracy, price, and latency, respectively. The variable hypothesis is an index indicating the particular hypothesis being analyzed, and variable score indicates the score of the hypothesis, as determined by natural language interpreter 21. Variable cost[ ] is the estimate cost, for each data source.

For each hypothesis, natural language interpreter 21 computes a domain of knowledge for the query. Each domain has a default data source, indicated by variable domain_default_source. To ensure that the request generation 25 will issue at least one request to a data source, the function sets the cost[ ] variable for the default domain to zero. In some embodiments, NL interpreter 21 produces a plurality of domains needed to respond to queries requiring multiple values of data in the answer. In some embodiments, NL interpreter 21 invokes the query processor multiple times for a query, using the result of one invocation to resolve unknown information required for further evaluation of the interpretation and therefore further invocation of the query processor. In some embodiments, NL interpreter 21 invokes the query processor multiple times to resolve multiple different likely correct interpretations of the query. In some embodiments NL interpreter 21 accumulates data from multiple answers from multiple invocations of query processor 22.

The embodiment of FIG. 3 maintains a credit count per user. Whenever the user pays the virtual assistant provider, the user's number of credits increases. For each query, the credit count decreases by a small fraction. The function call remaining_credit( ) returns the value of the users remaining credit. Variable thresh_cost represents the cost threshold. As the user's remaining credits decrease, the threshold for accessing secondary data sources decreases. As a result, all users will get answers to all queries, but users who pay more will tend to get results that are faster and more accurate.

The final for loop in the function of FIG. 3 calls function data_type_match( ), which takes as arguments a source, entity ID, and attribute, and checks to see if the entity and attribute are ones that the data source can serve. The entity ID and attribute are output by natural language interpreter 21. If the data source has data for the attribute of the entity, and if the cost of access to the data source is less than the threshold, then the function of FIG. 3 calls the function hit_source( ). It takes as arguments a source number, the entity ID, and the attribute, and sends an API hit request from request generation 25 to the data source and receives the response for response processing 26.

The algorithm shown in FIG. 3 is merely illustrative. It is not a full implementation of an embodiment of the invention, and does not show any of numerous possible variations that will be apparent to ordinarily skilled practitioners. In particular, there is no limit to the variations of request generation algorithms appropriate for embodiments, and there is no limit to the variations of cost estimate algorithms. Some examples of variable factors included in more complex cost function calculations are time of day, variable contracted rates, data center location, net lag, and presence of data in a cache.

Some cost functions depend on attributes of multiple sources. For example, in one cost function, the cost of a second data access depends on whether the cost of an access to the lowest cost source is below a particular threshold. In another example, the cost function for one source depends on the number of requests pending at another source.

Some cost functions depend on user feedback. For example, some embodiments accept from users a thumbs-up or thumbs-down indication about a prior response. Some such embodiments increase the cost for data sources that served data that resulted in a user thumbs-down indication. This steers the system away from data sources that have inaccurate data or in other ways dissatisfy users. Conversely, the embodiment decreases the cost, and thereby steers towards data sources that satisfy users. Some cost functions use the ratio of thumbs-up to thumbs-down indications, as long as the system has received a certain count of indications for the particular data source. As is apparent to ordinarily skilled practitioners, some embodiments use other means of user feedback and some embodiments use feedback information from sources other than direct user input.

Figure 4:
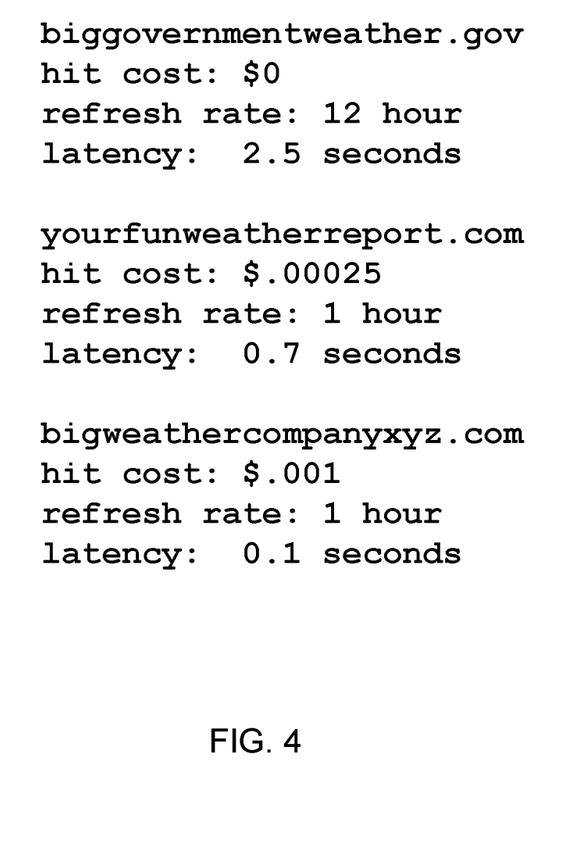
FIG. 4 illustrates a table of weather data sources and their price, refresh rates, and latencies according to an embodiment of the invention.

FIG. 4 shows examples of cost, accuracy, and latency information for API hits to three imaginary weather data sources. Data source biggovernmentweather.gov provides weather data free of charge with hit cost of $0, but with refresh rate of 12 hour updates, and a request to response latency of 2.5 seconds. Data source yourfunweatherreport.com provides weather data for 0.025 cents per API hit, with refresh rate of 1 hourly updates, and a request latency of 0.7 seconds. Data source bigweathercompanyxyz.com provides weather data for 0.1 cents per API hit, with refresh rate of 1 hourly updates, and a request latency of 0.1 seconds.

Some embodiments validate data from one or more sources to confirm that the received data values make sense. Some embodiments checks a data checksum to ensure that error-prone data transmission was successful. Some embodiments checks date data to confirm that days of the month are less than or equal to 31 and that if the month is February the number of days is less or equal to 29, and less than or equal to 28 if the year is not an integer multiple of 4. Some embodiments, upon receiving a person data record, check that the gender matches the gender expected by an interpretation. For example, a query about the president's mother should return information about a female person. Some embodiments that perform data validation send a request to a second data source only if a data validation fails to yield a confirmation. Some embodiments record data validation failures, and use the records to rate data providers and negotiate contracts.

Some embodiments perform data validation by issuing corresponding requests to multiple data sources and comparing the results. This is useful in embodiments that measure data from separate sensors. For example, it is usual that different weather data providers give slightly different forecasts for a daily high temperature. Some embodiments choose the data to use in the answer based on the difference between responses from multiple data sources. For example, if a first data sources gives more information but a second source gives more accurate values for a smaller set of information, if the comparison finds that the two data sources are close enough on corresponding information then the embodiment chooses the first data source information in the answer. However, if the corresponding data values are different beyond a certain threshold then the system provides only the smaller amount of information from the second source in the answer.

Figure 5:
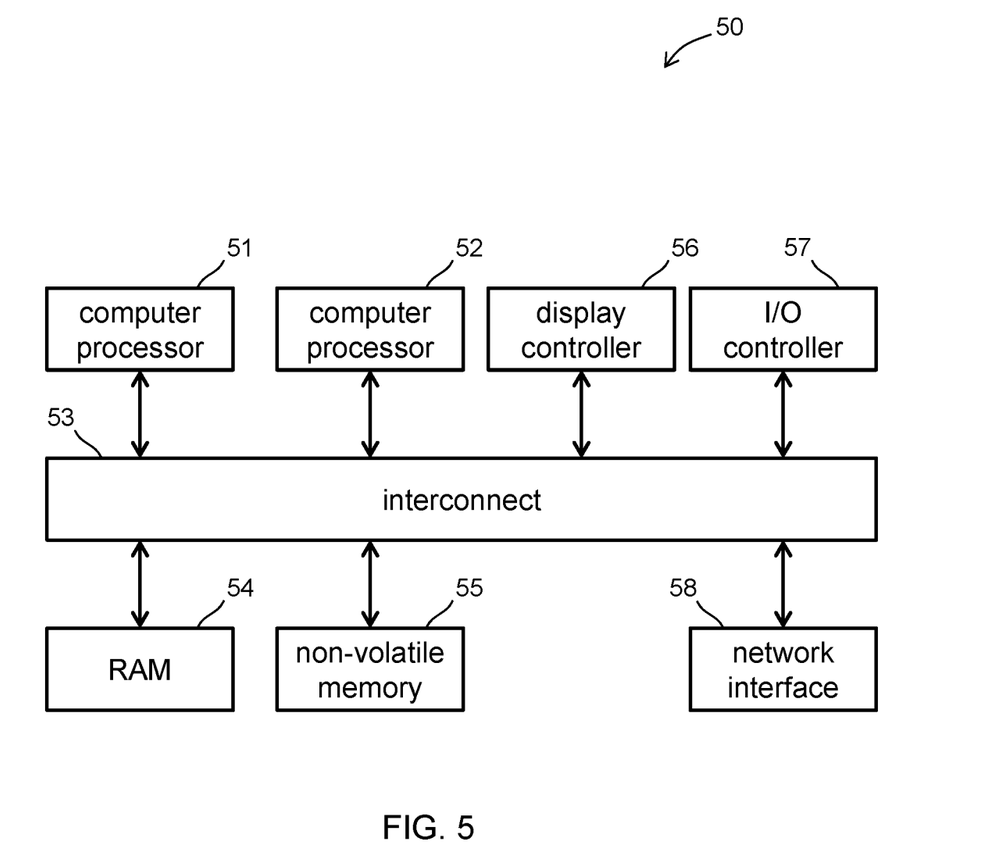
FIG. 5 illustrates a computer system according to an embodiment of the invention.

FIG. 5 shows a computer system 50 the runs software according to an embodiment. Computer processors 51 and 52 connect to interconnect 53, through which they read instructions from RAM 54 and non-transitory computer readable memory 55. Display controller 56 connects to interconnect 53 and provides for a graphical user interface display. I/O controller 57 connects to interconnect 53 and provides for user input, including touch screen, USB keyboard, and microphone as well as speaker audio output. Network interface 58 connects to interconnect 53 and provides for 4G LTE, Wi-Fi, and Bluetooth access to the Internet. Numerous other functional combinations of hardware, software, input and output devices, and network connectivity devices, to implement other embodiments, will be apparent to ordinarily skilled practitioners.

Computer system 50 comprises multiple computer processors. In various embodiments, these multiple computer processors are on separate circuit boards, separate chips, separate cores within a single chip, or separate hardware threads within a single core. In various embodiments, the computer processors execute software written for the x86 instruction set, ARM instruction set, PowerPC instruction set, or extended instruction sets of custom computer processors. Some embodiments use many-core chips with tens or hundreds of small computer processors, the chips, computer processor instruction sets, or both being optimized for the minimum power consumption needed for artificial intelligence processing tasks in power-constrained, heat-constrained, data centers.

By dividing the functions of various embodiments into separate software threads that run on separate computer processors, the computer processors perform with higher throughput. This is in part because the software for each function resides in each computer processor's local instruction cache and is less likely to be replace by software for other functions. The higher performance throughput is also possible because computer processors performing data source accesses consume a lot of network bandwidth relative to the number of instructions processed. By optimizing certain computer processors for optimal network bandwidth requirements, they perform with higher data source access throughput. Conversely, by running software such as for hypotheses pruning, determining data sources, cost estimation, and response processing on dedicates computer processors, they do not need to stall for network accesses, and therefore provide greater processing throughput. Another benefit of that is that with greater processing throughput, embodiments are able to process a greater number of hypotheses for each query within tolerable latencies. Processing a greater number of hypotheses results in fewer incorrect interpretations, and therefore greater satisfaction for system users.

What is claimed is:

1. A method of processing interpretations of natural language queries, the method comprising:
   determining, by a computer system, a plurality of hypothesized interpretations of a natural language query, each interpretation of the plurality of hypothesized interpretations including one or more entities and one or more attributes and including a likelihood score indicating a likelihood that the each interpretation is correct;
   (a) determining, by the computer system, a plurality of data sources that might be able to provide values based on the one or more entities and one or more attributes in the plurality of hypothesized interpretations;
   (b) identify a first interpretation of the plurality of hypothesized interpretations for which a cost of one or more first data sources of the plurality of data sources meets a threshold condition by, for each data source of the one or more first data sources, calculating the cost as a weighted sum of an access price and a latency for the each data source with the weighted sum multiplied by the likelihood score of the first interpretation;
   request the values based on the one or more entities and one or more attributes in the first interpretation.

2. The method of claim 1, wherein (a) comprises determining the plurality of data sources as a function of a type of the entities and attributes.

3. The method of claim 1, wherein (a) comprises determining the plurality of data sources as a function of dynamic availability of the plurality of data sources.

4. The method of claim 1, wherein (a) comprises determining the plurality of data sources as a function of the domains of discourse of the plurality of hypothesized interpretations.

5. The method of claim 1 wherein (a) comprises determining the plurality of data sources as a function of a history of recent queries.

6. The method of claim 1, further comprising estimating, for at least one data source of the plurality of data sources, the access price according to contracted monetary consideration for accessing the at least one data source.

7. The method of claim 1, wherein (b) further comprises calculating the cost of the each data source of the one or more first data sources further as a function of a quality of the each data source.

8. The method of claim 1, wherein (b) further comprises calculating the cost of the each data source of the one or more first data sources by executing a cost function.

9. The method of claim 8, wherein the cost function of the each data source of the one or more first data sources depends on an attribute of a different data source of the plurality of data sources.

10. The method of claim 8, further comprising receiving feedback, from a user, regarding a previous answer, wherein (b) further comprises calculating the cost of the each data source of the one or more first data sources based on the feedback.

11. The method of claim 8 further comprising recording the availability of the each data source of the plurality of data sources;
wherein (b) further comprises calculating the cost of the each data source of the one or more first data sources further as a function of the availability of the each data source.

12. The method of claim 1 further comprising:
providing the values based on the one or more entities and the one or more first data sources of the first interpretation as a response to the natural language query.

13. The method of claim 1 further comprising:
identifying a second interpretation for which one or more second data sources of the plurality of data sources are likely to provide the values based on the one or more entities and the one or more attributes in the second interpretation and for which the cost of the one or more second data sources meet the threshold condition, the cost of the one or more second data sources being a function of the access price of the one or more second data sources and the likelihood score of the second interpretation; and
wherein the method further comprises returning the values based on the one or more entities and the one or more attributes of only one interpretation of the first interpretation and the second interpretation as a response to the natural language query.

14. The method of claim 13, further comprising validating the values based on the one or more entities and the one or more attributes of the first interpretation and the second interpretation performing and selecting the only one interpretation based on the validating.

15. The method of claim 13 further comprising comparing the values based on the one or more entities and the one or more attributes of the first interpretation and the second interpretation and selecting the only one interpretation according to the comparing.

16. The method of claim 1 further comprising:
storing the values based on the one or more entities and the one or more attributes of the first interpretation in a cache; and
using the values based on the one or more entities and the one or more attributes of the first interpretation from the cache in an answer to a future query.

17. The method of claim 1 wherein the method is performed on a many-core chip optimized for the minimum power consumption needed for artificial intelligence processing tasks.

18. The method of claim 1 further comprising:
refining the first interpretation based on the values based on the one or more entities and one or more attributes of the first interpretation from the one or more first data sources.

* * * * *